United States Patent [19]

Kimura et al.

[11] Patent Number: 5,550,797
[45] Date of Patent: Aug. 27, 1996

[54] OPTICAL REPRODUCTION SIGNAL PROCESSING CIRCUIT FOR PRODUCING AN RF SIGNAL AND A SERVO SIGNAL WITH A HIGH SIGNAL TO NOISE RATIO EVEN THOUGH THE RF SIGNAL COMPONENT AND THE SERVO SIGNAL COMPONENT PARTIALLY OVERLAP IN FREQUENCY DISTRIBUTION

[75] Inventors: Motoi Kimura, Kanagawa; Shunji Yoshimura, Tokyo; Kyoko Suzuki, Kanagawa, all of Japan

[73] Assignee: Sony Corporation, Tokyo, Japan

[21] Appl. No.: 344,842

[22] Filed: Nov. 23, 1994

[30] Foreign Application Priority Data

Nov. 25, 1993 [JP] Japan .................. 5-295774

[51] Int. Cl.$^6$ .................. G11B 7/95
[52] U.S. Cl. .................. 369/44.41; 369/44.32; 369/124
[58] Field of Search .................. 369/44.41, 44.42, 369/48, 47, 44.11, 44.32, 124; 250/201.5

[56] References Cited

U.S. PATENT DOCUMENTS 5,229,984  7/1993  Komo et al. .................. 369/44.41

FOREIGN PATENT DOCUMENTS 0142715  6/1991  Japan .

*Primary Examiner*—W. R. Young
*Assistant Examiner*—Thang V. Tran
*Attorney, Agent, or Firm*—Limbach & Limbach L.L.P.; Philip M. Shaw, Jr.

[57] ABSTRACT

A processing circuit for an optical reproduction signal provided with a signal generating unit for dividing an optical reproduction signal output from a photo detector and including a plurality of signal components into a plurality of signals having frequency regions corresponding to the respective plurality of signal components and performing current/voltage conversion on the divided optical reproduction signals and a correcting unit for adding the results of the current/voltage conversion of the signal components to correct the results of the current/voltage conversion.

8 Claims, 13 Drawing Sheets

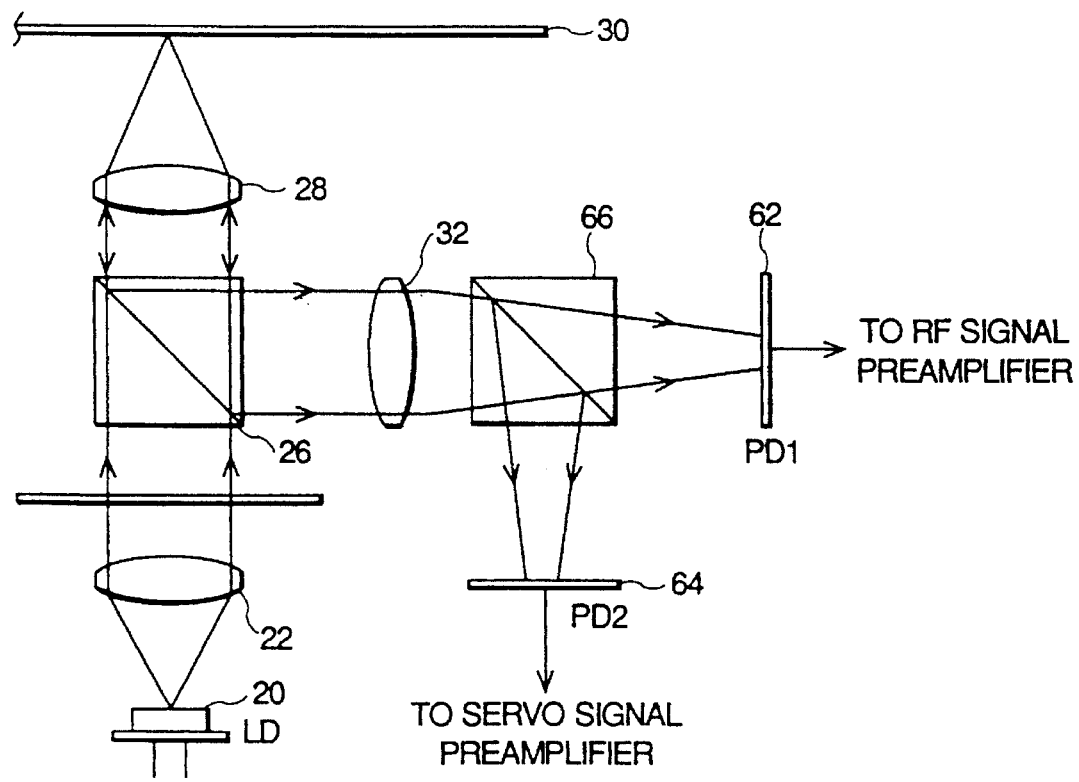

OPTICAL REPRODUCTION SIGNAL PROCESSING CIRCUIT FOR PRODUCING AN RF SIGNAL AND A SERVO SIGNAL WITH A HIGH SIGNAL TO NOISE RATIO EVEN THOUGH THE RF SIGNAL COMPONENT AND THE SERVO SIGNAL COMPONENT PARTIALLY OVERLAP IN FREQUENCY DISTRIBUTION

BACKGROUND OF THE INVENTION

1. Field of the Invention

The present invention relates to a processing circuit for an optical reproduction signal which converts the signal from a photo detector used in an optical disc apparatus etc. from a current to voltage (I-V) and outputs it divided into an RF signal and a servo signal.

2. Description of the Related Art

In an optical disc apparatus, the beam of laser light reflected at the optical disc is detected by, for example, a four division photo detector (PD) which detects the beams on four divided sections, and is used as the optical reproduction signal. This optical reproduction signal is usually treated as a current and includes a servo signal used for tracking servo control as a low frequency component and an RF signal used for reproduction of information as a high frequency component.

As a optical reproduction signal processing circuit for converting an optical reproduction signal from a current to voltage and outputting it divided into the servo signal and RF signal, the circuit shown in FIG. 1 is used. This circuit is equivalent to the so-called "separation type I" circuit disclosed in Signal Processing Technology in Optical Recording (in Japanese), Trikeps Co. (phonetic), p. 104, Feb. 20, 1989.

This optical reproduction signal processing circuit 7, as shown in FIGS. 2A to 2C, is used in the case where the low frequency component $I_{LF}$ for the RF signal and the high frequency component $I_{SV}$ for the servo signal do not overlap that much. The high frequency components including mainly the RF signal in the optical reproduction signals output from four photodiodes 340 to 346 are added by an RF signal I-V conversion circuit 70 comprised of capacitors C71 to C74, a resistor Rf70, and an amplification circuit AMP 70, converted from current to voltage, and then output as the RF signal.

On the other hand, the low frequency components including mainly the servo signal in the optical reproduction signals output from the four photodiodes 340 to 346 are converted from current to voltage by I-V conversion circuits 71 to 74 comprised respectively of resistors R71 to R74, resistors Rf71 to Rf74, and the amplification circuits AMP71 to AMP74 and then output as the servo signals SERVO1 to SERVO4.

By this, the optical reproduction signal with the frequency distributions of the servo signal component $I_{SV}$ and RF signal component $I_{RF}$, shown in FIG. 2A for example is converted from a current to a voltage by the optical reproduction signal processing circuit 7. As a result, the RF signal (RF) shown by the graph of the frequency distribution in FIG. 2B and the servo signals (SERVO1 to SERVO4) shown by the graph of the frequency distribution in FIG. 2B are obtained.

As the recording density of optical discs becomes greater, however, the frequency distribution of the RF signal component and the frequency distribution of the servo signal component of the optical reproduction signal overlap more frequently. In this case, it is not possible to use the above-mentioned optical reproduction signal processing circuit 7.

Therefore, proposals have been made on improvements of the configuration of the optical signal processing circuit and improvements of the configuration of the optical system.

For example, as shown in FIG. 3, an optical reproduction signal processing circuit 8 of an example of the former improvement converts the optical reproduction signals from the photodiodes 340 to 346 from a current to voltage by the I-V conversion circuits 81 to 84, then adds the servo signals SERVO1 to SERVO4 by the addition circuit 80 and outputs the result as the RF signal. This circuit is equivalent to the operational amplifier type disclosed at page 103 of the aforementioned Signal Processing Technology in Optical Recording.

According to this optical reproduction signal processing circuit 8, the RF signal shown in FIG. 4A and the servo signal shown in FIG. 4B output from the optical reproduction signal processing circuit 8 do not have frequency characteristics. That is, the RF signal processing circuit and servo signal processing circuit disposed after the optical reproduction signal processing circuit 8 receive input signals derived from both of the RF signal component and servo signal component of the optical reproduction signal, and so can be used even in a case where the low frequency component used as the RF signal and the high frequency component used as the servo signal overlap.

The optical system of an example of the latter case, for example, as shown in FIG. 5, uses a half mirror 66 to divide into two the light reflected from the optical disc 3, separately detects the divided reflected light by the RF signal photo detector 62 and servo signal photo detector 64, and inputs the resultant optical reproduction signals to the RF signal preamplifier and servo signal preamplifier.

If such an optical system 9 is used, the RF signal and the servo signal are generated from the optical reproduction signals obtained from the separate photo detectors 62 and 64, so signal processing is possible without concern as to the overlap of the frequency distribution of the RF signal component and the frequency distribution of the servo signal component of the optical reproduction signals.

In the optical reproduction signal processing circuit 8 of the related art shown in FIG. 3, however, when use was made of a four division photo detector, it was necessary to add the output signals of the I-V conversion circuits 81 to 84 to obtain the RF signal. Accordingly, the power of the noise component of the I-V conversion circuits of the RF signal output of the optical reproduction signal processing circuit 8 became four times the noise component of the I-V conversion circuit of the RF signal of the optical reproduction signal processing circuit 7. To reduce the noise component, it was necessary to use an amplification circuit with low noise.

In addition, the RF signal output and the servo signal output of the optical reproduction signal processing circuit 8 extended over a wide frequency region from DC to several tens of MHz, so the amplification circuits had to have broader coverage and DC stability.

In this way, the amplification circuits used for the optical reproduction signal processing circuit 8 had to be higher class circuits meeting the above conditions and therefore it suffers from the disadvantage that the cost of the optical disc apparatus using the optical reproduction signal processing circuit 8 became higher.

The above disadvantage in the I-V conversion processing can be solved by using the optical system 9 shown in FIG.

5, but in this type of optical system 9, it was necessary to further provide a half mirror 66 and photo detectors in the optical system in the case of using the optical reproduction signal processing circuits 7 and 8 of FIG. 1 and FIG. 3. As a result, the cost of the optical disc apparatus using the optical system 9 increased by the amount of the half mirror 66 and the photo detectors and efforts to reduce the size of the apparatus were obstructed.

SUMMARY OF THE INVENTION

The present invention was made in consideration of the above disadvantage and has as its object to provide an optical reproduction signal processing circuit which is able to produce an RF signal and servo signal of a high quality with little noise etc. without causing higher costs even in the case where the RF signal component and servo signal component of the optical reproduction signal partially overlap in frequency distribution.

To achieve the above object, the processing circuit for an optical reproduction signal according to the present invention is provided with a signal generating means for dividing an optical reproduction signal output from a photo detector and including a plurality of signal components into a number of frequency regions corresponding to the plurality of signal components and performing current/voltage conversion on the divided optical reproduction signals and a correcting means for adding the results of the current/voltage conversion of the signal components to correct the results of the current/voltage conversion.

Preferably, the signal generating means, when dividing an optical reproduction signal in accordance with signal components partially overlapping each other in the frequency regions in which they are located, divides the optical reproduction signal into a frequency region in which one of the overlapping signal components is located and another frequency region. The correcting means adds the results of the current/voltage conversion corresponding to the frequency region in which one of the overlapping signal components is located to the results of current/voltage conversion corresponding to the other frequency region to correct dropout of information of the results of current/voltage conversion corresponding to the other frequency region.

Still more preferably, the plurality of signal components are the RF signal component used for reproduction of information in the optical disc apparatus and the servo signal used for focus servo and tracking servo control and the frequency regions in which these signal components are located partially overlap. The one specific overlapping signal component may be the RF signal component or the servo signal component.

The signal generating means generating the RF signal and the servo signal is comprised of resistors and capacitors and has a signal dividing means for dividing the optical reproduction signal and a current/voltage converting means comprised of an amplifier and its negative feedback resistor.

The signal dividing means supplies the region of the optical reproduction signal above a predetermined frequency to the RF signal current/voltage converting means and the region below the predetermined frequency to the servo signal current/voltage converting means.

The current/voltage converting means converts the divided optical reproduction signals from a current to a voltage.

If the RF signal component and servo signal component in an optical reproduction signal overlap in frequency distribution, there is a partial dropout of information required for information reproduction processing or tracking servo processing at the time of division of the optical reproduction signal.

The information of one of the I-V conversion results is added to the other results by the correcting means so as to make up for the dropout of the information caused at the time of division of the optical reproduction signal and produce a complete RF signal or servo signal.

BRIEF DESCRIPTION OF THE DRAWINGS

These and other objects and features of the present invention will become clearer from the following description of the preferred embodiments made with reference to the following drawings, in which:

FIGS. 2A to 2C are views of the frequency distributions of the signal components (servo signal component $I_{SV}$ and RF signal component $I_{RF}$) included in the optical reproduction signal input to the optical reproduction signal processing circuit shown in FIG. 1 and the RF signal (RF) and servo signal (SERVO) output from the optical reproduction signal processing circuit, wherein FIG. 2A shows the frequency distributions of the servo signal component $I_{SV}$ and the RF signal component $I_{RF}$, FIG. 2B shows the frequency distribution of the RF signal, and FIG. 2C shows the frequency distribution of the servo signal;

FIGS. 4A and 4B are views of the frequency distribution of the RF signal (RF) and the servo signal (SERVO) output from the optical reproduction signal processing circuit shown in FIG. 3, wherein FIG. 4A shows the frequency distribution of the RF signal and FIG. 4B shows the frequency distribution of the servo signal;

FIG. 5 is a view of an example of a prior art optical system in an optical disc apparatus;

FIGS. 8A to 8D are views of the frequency distributions of a servo signal component and RF signal component included in an optical reproduction signal obtained from the photodiode or photo detector shown in FIG. 7, wherein FIGS. 8A and 8B show the servo signal component and the RF signal component in the case of little overlap of the frequency distribution of the servo signal component and the frequency distribution of the RF signal component in the optical reproduction signal and FIGS. 8C and 8D show the servo signal component and the RF signal component in the case of considerable overlap of the frequency distribution of the servo signal component and the frequency distribution of the RF signal component in the optical reproduction signal;

FIGS. 10A to 10C are views for explaining the operation of the optical reproduction signal processing circuit shown in FIG. 9, wherein FIG. 10A shows the divided frequency characteristics of the current $I_{RF}$ input to the RF signal generating circuit and the current $I_{SV}$ input to the servo signal generating circuit obtained by division of the optical reproduction signal $I_{pd}$, FIG. 10B shows the frequency distribution of the RF signal (RF) output by the RF signal generating circuit, and FIG. 10C shows the frequency distribution of the servo signal (SERVO) output by an addition circuit;

FIGS. 13A to 13C are views for explaining the operation of the optical reproduction signal processing circuit shown in FIG. 12, wherein FIG. 13A shows the divided frequency characteristics of the current $I_{RF}$ input to the RF signal generating circuit and the current $I_{SV}$ input to the servo signal generating circuit obtained by division of the optical reproduction signal $I_{pd}$, FIG. 13B shows the frequency distribution of the RF signal (RF) output by the addition circuit, and FIG. 13C shows the frequency distribution of the servo signal (SERVO) output by an I-V conversion circuit.

DESCRIPTION OF THE PREFERRED EMBODIMENTS

A first embodiment of the present invention will first be explained below with reference to the drawings.

Figure 6:
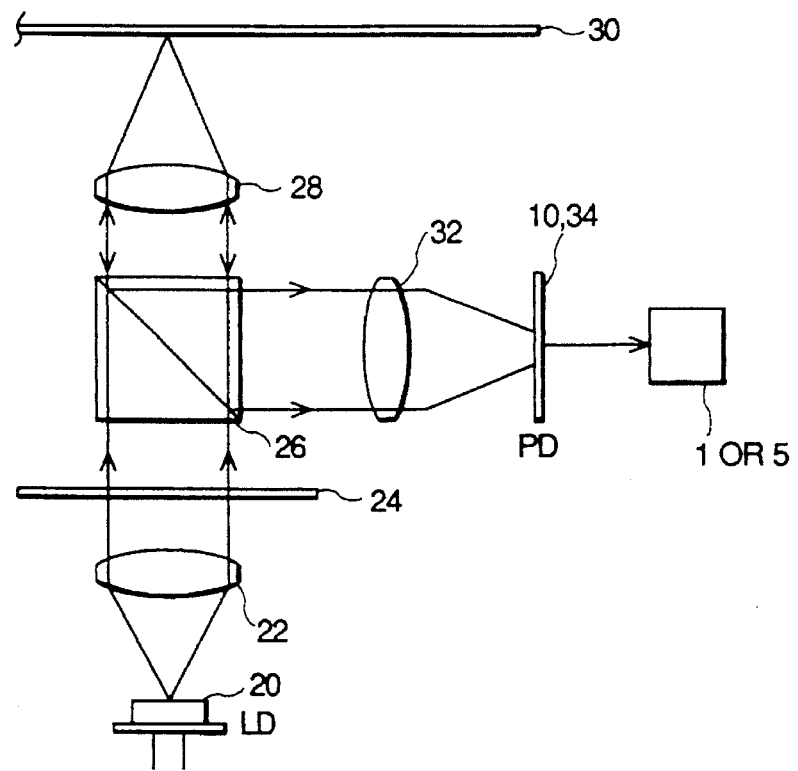
FIG. 6 is a view of an example of the configuration of an optical system of an optical disc apparatus in which the optical reproduction signal processing circuit of the present invention is used.
Figure 7:
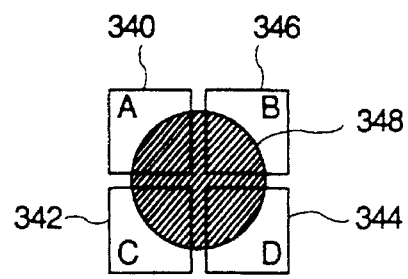
FIG. 7 is a view of the configuration of a four division photo detector used in the optical disc apparatus.
Figure 9:
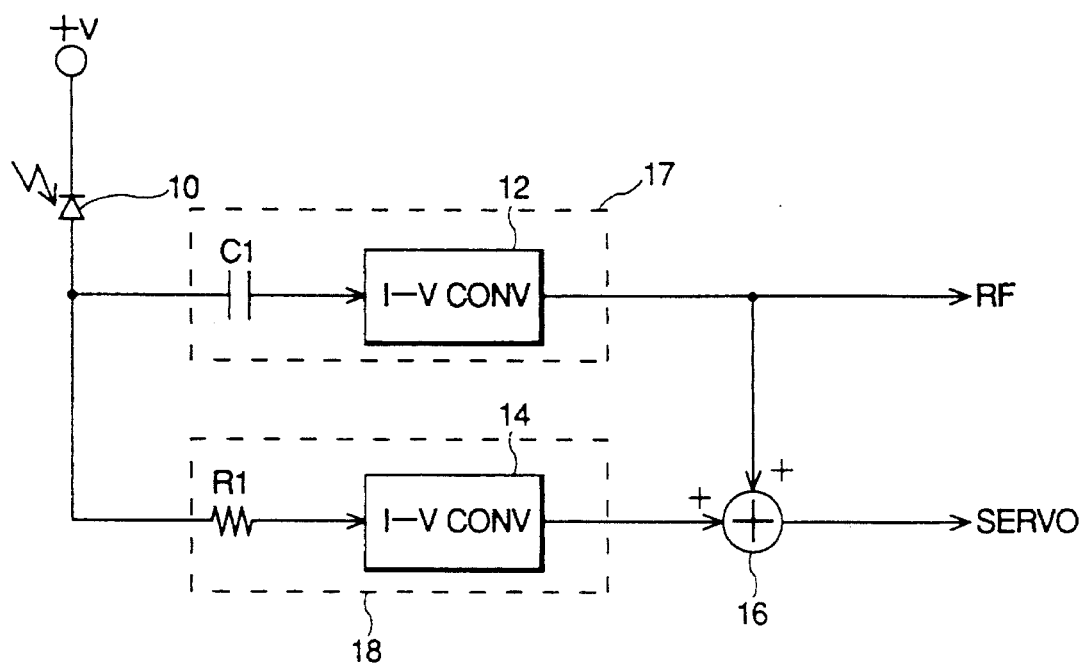
FIG. 9 is a view of the configuration of the optical reproduction signal processing circuit of a first embodiment of the present invention.
Figure 10A:
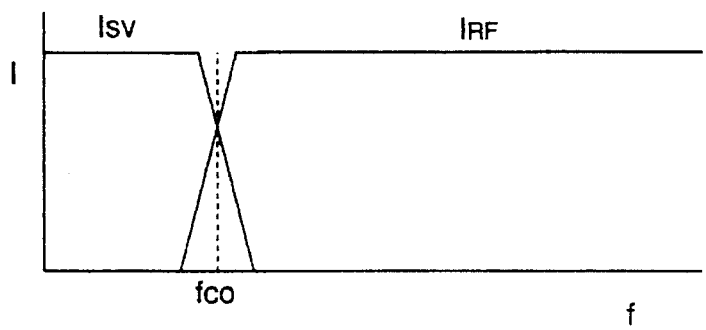
Figure 10B:
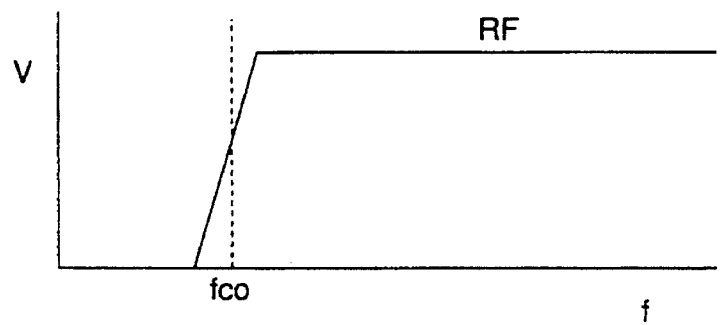
Figure 10C:
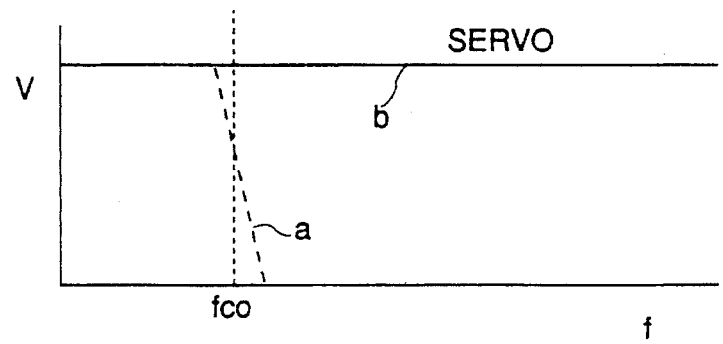

FIG. 6 is a view of an example of the configuration of an optical system 2 in the case where the optical reproduction signal processing circuit according to a first embodiment of the present invention is applied to an optical disc apparatus; FIG. 7 is a view of the configuration of a four division photo detector 34 of FIG. 6; FIGS. 8A to 8D are views of the frequency distributions of a servo signal component and RF signal component included in an optical reproduction signal of an optical disc apparatus; FIG. 9 is a view of the basic configuration of the optical reproduction signal processing circuit I of the embodiment; and FIGS. 10A to 10C are views for explaining the operation of the optical reproduction signal processing circuit 1 shown in FIG. 9.

Figure 11:
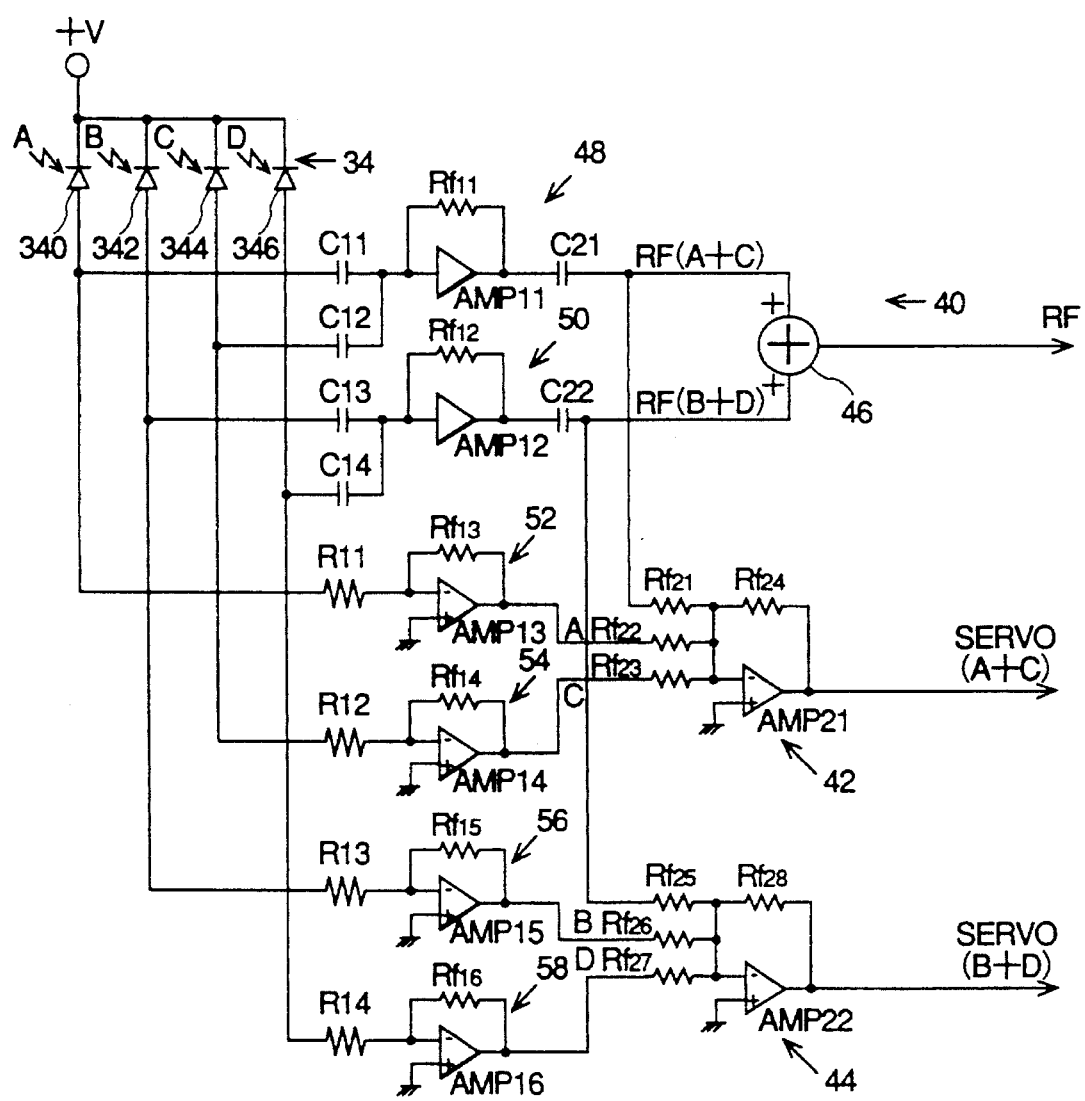
FIG. 11 is a view of the optical reproduction signal processing circuit of the present invention used in an optical disc apparatus using the photo detector shown in FIG. 7.

Further, FIG. 11 is a view of the optical reproduction signal processing circuit & of the embodiment used in an optical disc apparatus using the photo detector 34 shown in FIG. 7.

Optical system

First, the optical system shown in FIG. 6 differs from the optical system 9 shown in FIG. 5 in that it does not have the half mirror 66 and has only one photo detector.

That is, the optical system 2 is comprised of a semiconductor laser 20, a collimating lens 22, a diffraction grating 24, a beam splitter 26, an object lens 28, a focus detection lens 32, and a photodiode 10 or photo detector 34.

The laser beam generated from the semiconductor laser 20 passes through the collimating lens 22, the diffraction grating 24, the beam splitter 26 and the object lens 28, and exposes the optical disc 30.

The laser beam including the information signal and the servo signal recorded on the optical disc 30 and reflected from the optical disc 30 is guided through the object lens 28, the beam splitter 26, and the focus detection lens 32 to the photodiode 10 or the photo detector 34, then the laser beam is detected by the photodiode 10 or the photo detector 34, converted to an electrical optical reproduction signal, and input to the optical reproduction signal processing circuit i etc. In this case, the optical reproduction signal is usually treated as a current signal.

Figure 1:
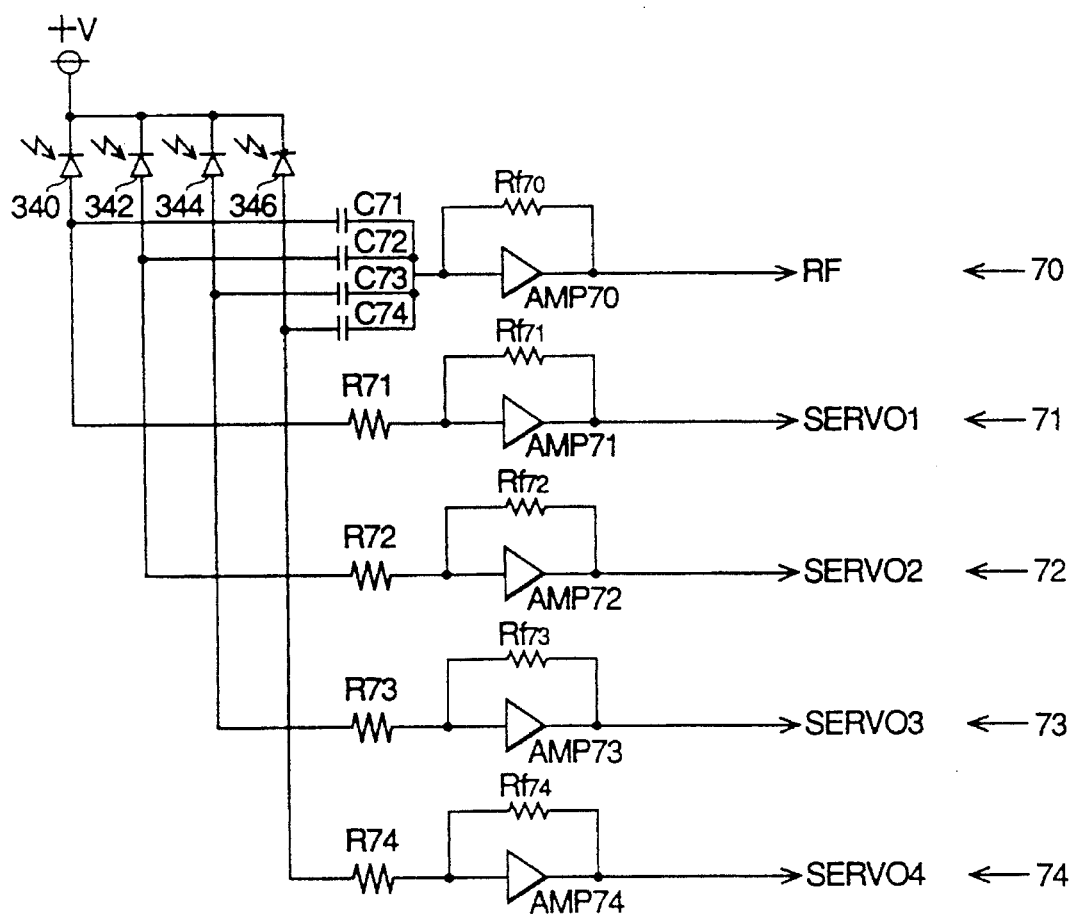
FIG. 1 is a view of the configuration of a first prior art of an optical reproduction signal processing circuit.
Figure 2A:
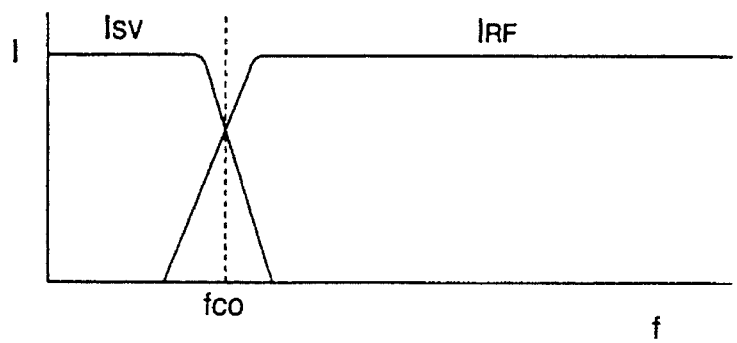
Figure 2B:
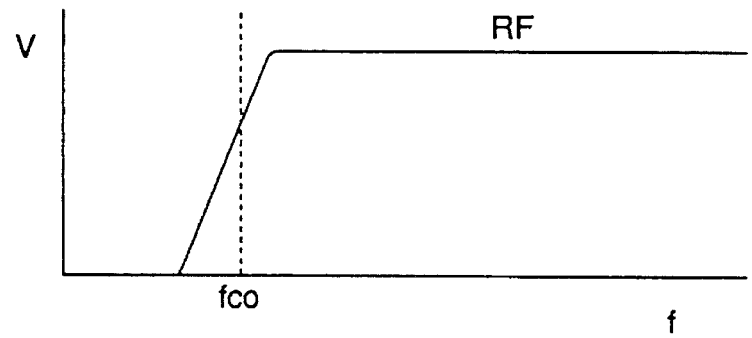
Figure 2C:
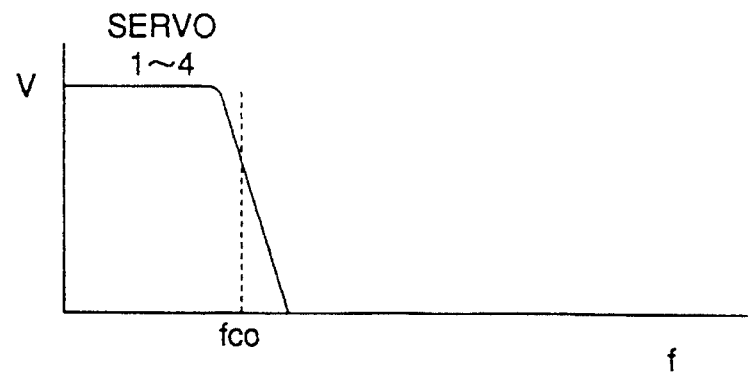

It is possible to use the four division configuration photo detector 34 shown in FIG. 2 as the photo detector of the embodiment, but the present invention is not limited to this. Use may also be made of a unitary configuration (or an integrated) photodiode.

The photo detector 34, as shown in FIG. 7, is comprised of four photodiodes, i.e., the photodiode (A) 340 to photodiode (D) 346. The light receiving pattern 348 illustrated shows the range which the laser beam strikes on the photo detector If the currents produced by the photodiodes 340 to 346 of the photo detector 34 are designated as A to D, then in the optical disc to which the optical reproduction signal processing circuit of the embodiment is applied, the current (A−B+C−D) is used as the focus error signal by the astigmatic method, the current (A−B−C+D) is used for tracking servo control as a track cross signal, and the current A+B+C+D is used as the sum signal (RF signal).

Basic configuration of optical reproduction signal processing circuit 1

The optical reproduction signal processing circuit 1 of this embodiment, however, divides the optical reproduction signal $I_{pd}$ into predetermined frequency regions and converts the divided optical reproduction signals from a current to voltage (I-V conversion) to produce the RF signal (RF) and the servo signal (SERVO).

That is, the optical reproduction signal processing circuit 1 of the embodiment, as shown in FIG. 9, is comprised of a photodiode 10, an RF signal generating circuit 17, a servo signal generating circuit 18, and an addition circuit 16. The RF signal generating circuit 17 and the servo signal generating circuit 18 correspond to the signal generating means according to the present invention and the addition circuit 16 corresponds to the correcting means according to the present invention.

The photodiode (PD) 10 is connected at its anode to the positive power source (+V) and at its cathode to one end of the resistor R1 and capacitor C1. It detects the laser beam reflected from the optical disc shown in FIG. 2, converts it to the optical reproduction signal $I_{pd}$, and supplies it to the RF signal generating circuit 17 and the servo signal generating circuit 18.

The RF signal generating circuit 17 constituting the signal generating means is comprised of the capacitor C1 and the I-V conversion circuit 12. One end of the capacitor C1 is connected to the cathode of the photodiode 10 and one end of the resistor R1, while the other end of the capacitor C1 is connected to the input terminal of the I-V conversion circuit 12. Further, the I-V conversion circuit 12 converts the RF signal component $I_{RF}$, of the optical reproduction signal input through the capacitor C1 from a current to voltage to produce the RF signal (RF).

The servo signal generating circuit 18 constituting the signal generating means is comprised of the resistor R1 and the I-V conversion circuit 14. One end of the resistor R1 is connected to the cathode of the photodiode 10 and the one end of the capacitor C1, while the other end of the resistor R1 is connected to the input terminal of the I-V conversion circuit 14. The I-V conversion circuit 14 converts the servo signal component $I_{SV}$ of the optical reproduction signal input through the resistor R1 from a current to voltage.

The addition circuit 16 according to the present invention, as shown in FIG. 9, adds the RF signal input from the I-V conversion circuit 12 to the signal converted from current to voltage at the I-V conversion circuit 14 so as to produce the servo signal (SERVO).

Figure 8A:
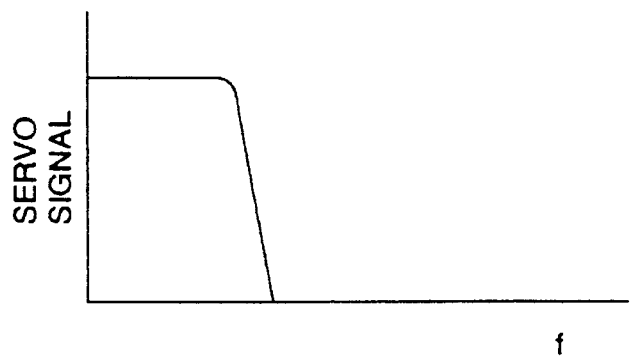
Figure 8B:
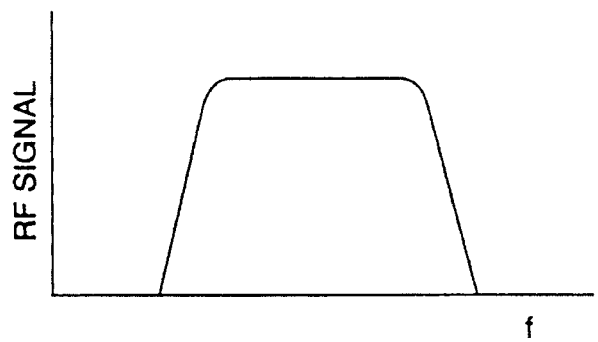
Figure 8C:
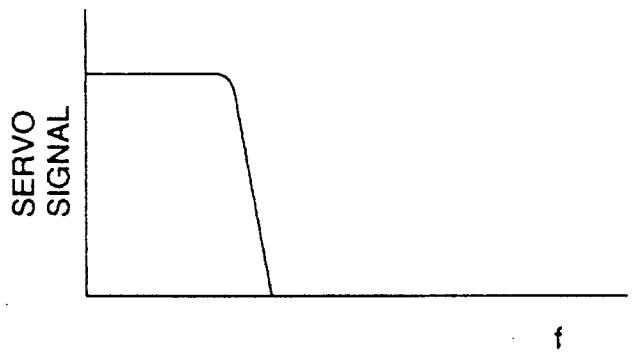
Figure 8D:
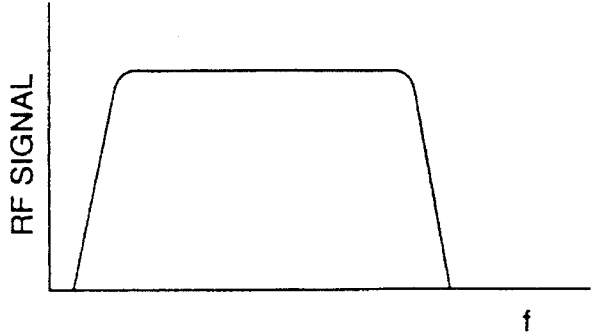

FIGS. 8A and 8B show the servo signal component and the RF signal component in the case of little overlap of the frequency distribution of the servo signal component and the frequency distribution of the RF signal component in the optical reproduction signal and FIGS. 8C and 8D show the servo signal component and the RF signal component in the case of considerable overlap of the frequency distribution of the servo signal component and the frequency distribution of the RF signal component in the optical reproduction signal.

As shown in FIGS. 8A and 8C, the optical reproduction signal $I_{pd}$ obtained from the photodiode 10 or the photo detector 34 includes the servo signal component (I) as a frequency component from DC to 100 kHz, while as shown in FIGS. 8B and 8D, the optical reproduction signal includes the RF signal component $I_{RF}$ as the frequency component from several MHz to several tens of MHz.

The frequency band of the RF signal differs tremendously depending on the optical disc apparatus. There are cases where the low frequency portion of the RF signal and the high frequency portion of the servo signal do not overlap as shown in FIG. 8B, and cases where they do overlap as shown in FIG. 8D. The optical reproduction signal processing circuit of this embodiment, however, can be applied to both cases.

Next, an explanation will be made of the operation of the optical reproduction signal processing circuit 1 of the present embodiment.

FIG. 10A shows the divided frequency characteristics of the current $I_{RF}$ input to the RF signal generating circuit 17 and the current $I_{SV}$ input to the servo signal generating circuit 18 obtained by division of the optical reproduction signal $I_{pd}$, FIG. 10B shows the frequency distribution of the RF signal (RF) output by the RF signal generating circuit 17, and FIG. 10C shows the frequency distribution of the servo signal (SERVO) output by the addition circuit 16.

First, as shown in FIG. 10A, the capacitor C1 located before the I-V conversion circuit 12 and the resistor R1 located before the I-V conversion circuit 14 are used to divide the optical reproduction signal $I_{pd}$ into predetermined frequency regions. The optical reproduction signals of those frequency regions are input to the RF signal generating circuit 17 and the servo signal generating circuit 18.

Here, the following equation stands:

$$I_{pd}=I_{SV}+I_{RF} \qquad (1)$$

At this time, at the frequency below the frequency $f_{co}$ of the following formula, the optical reproduction signal $I_{pd}$ is mostly applied to the servo signal generating circuit 18:

$$f_{co}=1/(2\pi R1 C1) \qquad (2)$$

where, R1 is the resistance of the resistor R1 and
C1 is the capacitance of the capacitor C1.

The ratio of distribution of the optical reproduction signal $I_{pd}$ is reversed at the frequency higher than the frequency $f_{co}$.

On the other hand, above the frequency $f_{co}$, the servo signal component $I_{SV}$ is reduced at the rate of −20 dB/dec.

The portions of the optical reproduction signal divided into the current $I_{RF}$ input to the RF signal generating circuit 17 and the current $I_{SV}$ input to the servo signal generating circuit 18 in the above way by the resistor R1 and the capacitor C1 are input to the I-V conversion circuits 12 and 14, respectively.

The I-V conversion circuit 12 converts the current $I_{RF}$ to voltage and outputs the result as the RF signal. Further, the I-V conversion circuit 14 converts the current $I_{SV}$ to voltage and inputs the result to the addition circuit 16.

Note that the value of the frequency $f_{co}$ is determined so as to match the lower limit of the frequency distribution of the RF signal component of the optical reproduction signal shown in FIGS. 8B and 8D, that is, so that all of the RF signal component of the optical reproduction signal is input to the I-V conversion circuit 14.

The frequency distribution of the RF signal is shown in FIG. 10B.

In this way, the frequency $f_{co}$ matches with the lower limit of the frequency distribution of the RF signal component of the optical reproduction signal. That is, the band required for the signal is determined by the information to be recorded, for example, the video data and the method of modulation, for example, FM modulation, so the values of R1 and C1 are determined so that the frequency distribution of the RF signal component is fully included. By doing this, all of the RF signal component of the optical reproduction signal is converted to an RF signal. Accordingly, in the rest of the circuit after the RF signal generating circuit 17, it is possible to prevent occurrence of problems due to the inability to reproduce data normally due to dropout of information in the RF signal component of the optical reproduction signal.

On the other hand, the servo signal component of the optical reproduction signal is converted from a current to voltage by the I-V conversion circuit 14 to become a voltage signal.

The result of conversion by the I-V conversion circuit 14 becomes the frequency distribution corresponding to the current $I_{RF}$ as shown by the dotted line a of FIG. 10C. Accordingly, part of the servo signal component of the optical reproduction signal divided at the frequency above the frequency $f_{co}$ in the servo signal component shown in FIGS. 8A and 8C is not input to the I-V conversion circuit 14. If nothing is done in this case, some of the information required for the focus servo and tracking servo processing at the optical disc apparatus to which the optical reproduction signal processing circuit 1 is applied would drop out and problems might occur.

Therefore, in the present embodiment, the addition circuit 16 is used to add the RF signal output from the I-V conversion circuit 12 to the I-V converted output from the I-V conversion circuit 14 for correction.

Due to the above correction operation, the servo signal output from the addition circuit 16 includes all of the information required for focus servo and tracking servo processing. The addition circuit 16 adds the RF signal to the result of conversion of the I-V conversion circuit 14 to correct the same and outputs the result as the servo signal SERVO.

Note that the ratio of the addition may be determined so that the frequency characteristic of the servo signal after addition becomes flat. This is because the ratio of the resultant voltage differs depending on the values of the resistors Rf13 to Rf16 in the I-V conversion circuit. The characteristic may be made flat by changing the values of the resistors Rf21 to Rf28 in the addition circuits and 44 of FIG. 11.

Figure 3:
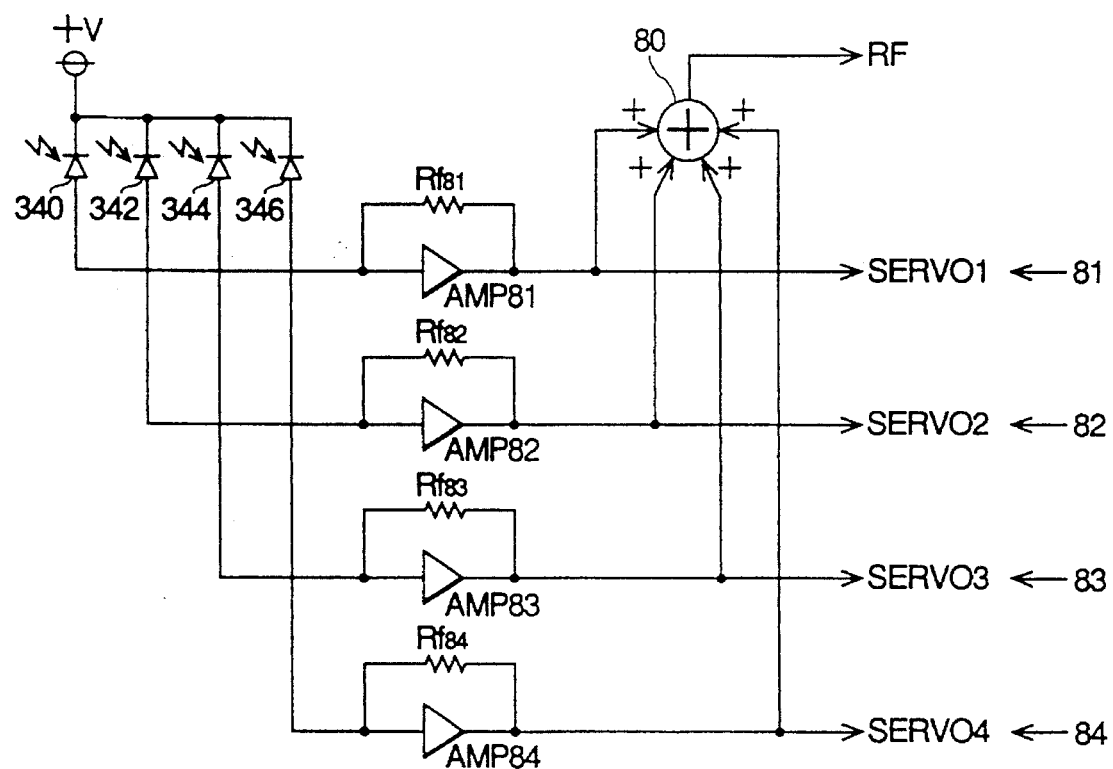
FIG. 3 is a view of the configuration of a second prior art of an optical reproduction signal processing circuit.
Figure 4A:
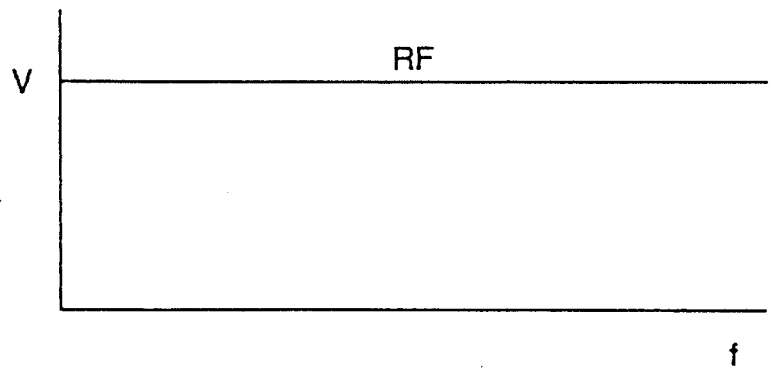
Figure 4B:
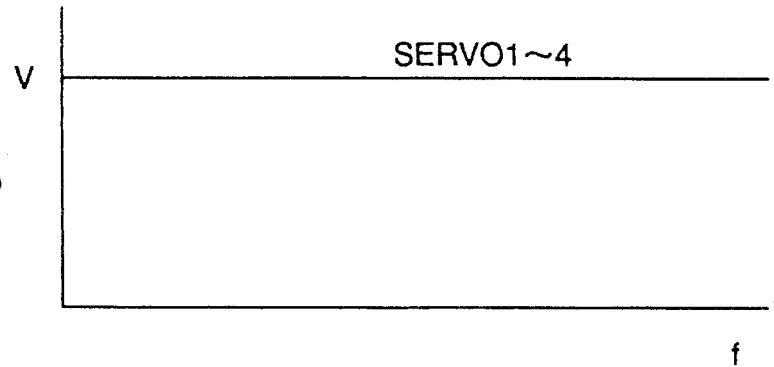

As will be understood from reference to FIG. 10B, the signal component near the DC is not input to the RF signal generating circuit 17, so the performance requirements of the I-V conversion circuit 12 are eased compared with the optical reproduction signal processing circuit 8 shown in FIG. 3.

In the above way, the optical reproduction signal processing circuit 1 of the embodiment directly produces the RF signal requiring the high S/N ratio from the current of the optical reproduction signal $I_{pd}$ and corrects and produces the servo signal requiring only a relatively low S/N ratio by the addition circuit 16. Accordingly, it can obtain a high quality RF signal and can obtain a servo signal of a sufficient quality.

Example of application to optical disc apparatus

Next, with reference to FIG. 11, an explanation will be made of the optical reproduction signal processing circuit 4 in the case of application of the present invention to an optical disc apparatus using a four division photo detector which performs tracking servo processing by the 3-spot method not requiring the track cross signal A–B–C+D.

Note that components of the optical reproduction signal processing circuit 4 not explained below are the same as the components with the same or similar references in the optical reproduction signal processing circuit 1 shown in FIG. 9.

The optical reproduction signal processing circuit like the optical reproduction signal processing circuit 1, divides the optical reproduction signals $I_{pd1}$ to $I_{pd4}$ obtained from the photodiodes 340 to 346 into the servo signal components $I_{SV1}$ to $I_{SV4}$ and the RF signal components $I_{RF1}$ to $I_{RF4}$. It is comprised of the photo detector 34, the RF signal generating circuit 40, the I-V conversion circuits 48 to 58, and the addition circuits 42 and Of these, the RF signal generating circuit 40 is comprised of the I-V conversion circuits 48 and 50 and the addition circuit The I-V conversion circuit 48 is comprised of the capacitors C11, C12, and C21, the resistor Rf11, and the amplification circuit AMP11. It adds the RF signal components $I_{RF1}$ and $I_{RF3}$, converts the result from current to voltage, and inputs the result as the signal RF(B+D) to the addition circuits 44 and 46.

Further, the I-V conversion circuits 52 to 58 are comprised of the resistors R11 to L14 and Rf13 to Rf16 and the operational amplifiers AMP13 to AMP16. They convert the servo signal components $I_{SV1}$ to $I_{SV4}$ from current to voltage and input the results as the signals A, C, B, and D to the addition circuits 42 and 44.

The addition circuit 42 is comprised of the resistors Rf21 to Rf24 and the operational amplifier AMP21. It adds the signals A and C input from the I-V conversion circuit 52 and 54 and adds the signal RF(A+C) to correct the same and produce the servo signal SERVO (A+C).

The addition circuit 44 is comprised of the resistors Rf25 to Rf28 and the operational amplifier AMP22. It adds the signals B and D input from the I-V conversion circuits 56 and 58 and adds the resultant signal with the signal RF (B+D) to correct the same and produce the servo signal SERVO (B+D).

Note that the addition circuit 46 adds the signal RF (A+C) and the signal RF (B+D) to produce and output the RF signal.

Here, the capacitors C11 to C14 input the signals of the frequencies over the frequency $f_{co}$ in the optical reproduction signal $I_{pd1}$ to $I_{pd4}$, that is, the RF signal components $I_{RF1}$ to $I_{RF4}$, to the corresponding I-V conversion circuits 48 and 50.

Further, the resistors R11 to R14 input the signals of the frequencies below the frequency $f_{co}$ in the optical reproduction signals $I_{pd1}$ to $I_{pd4}$, that is, the servo signal components $I_{SV1}$ to $I_{SV4}$, to the corresponding I-V conversion circuits 52 to 58.

In such an optical disc apparatus, the servo signals SERVO (A+C) and SERVO (B+D) are subtracted at the optical disc apparatus to which the optical reproduction signal processing circuit 4 is applied to obtain the difference (A–B+C–D) which is then used for processing as a focus error signal by the astigmatic method.

Note that the servo signals need not be the servo signals SERVO (A+C) and SERVO (B+D) obtained by adding two signals, but may be output as four independent signals. Further, if necessary, frequency correction may be performed on the RF signal as well.

Basic configuration of optical reproduction signal processing circuit 5

The optical reproduction signal processing circuit of the present invention is not limited to the above embodiment and may be modified in various ways. Below, an explanation will be made of a second embodiment of the present invention referring to the drawings.

Figure 12:
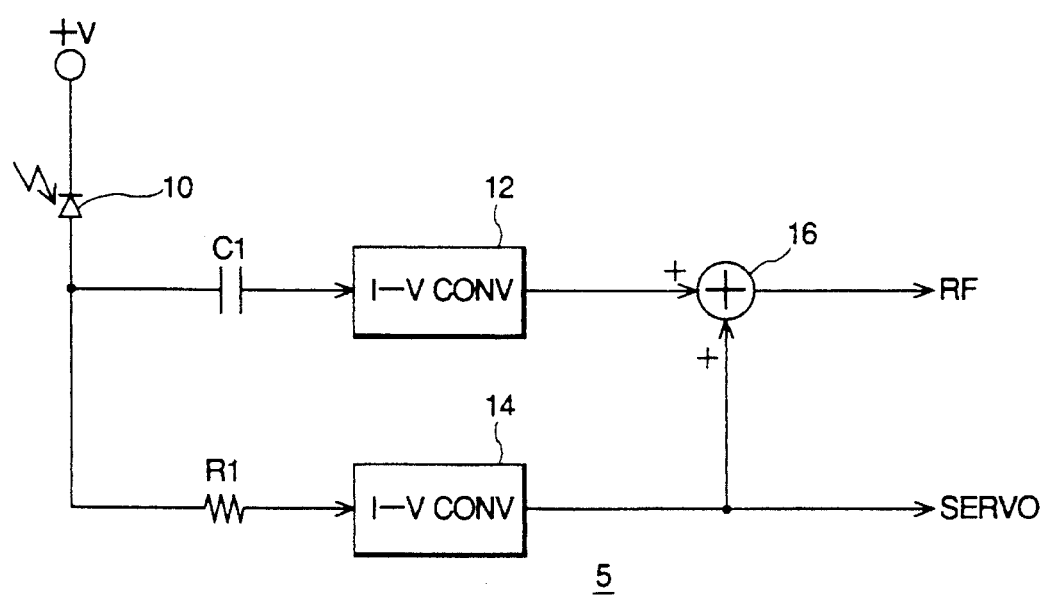
FIG. 12 is a view of the configuration of an optical reproduction signal processing circuit according to a second embodiment of the present invention.

FIG. 12 is a view of the basic configuration of an optical reproduction signal processing circuit 5 according to a second embodiment of the present invention. Note that components common with the optical reproduction signal processing circuits i and 4 of the first embodiment shown in FIGS. 7 to 9 and FIG. 11 are shown by the same or similar references in FIG. 12.

The optical reproduction signal processing circuit 5 of the second embodiment has an opposite relationship of the RF signal and servo signal in the first embodiment.

That is, the above-mentioned frequency $f_{co}$ defined by the resistor R1 and capacitor C1 is set for the upper limit of the frequency region in which the servo signal component $I_{SV}$ shown in FIGS. 8A and 8C is located. Accordingly, the I-V conversion circuit 12 receives as input all of the servo signal component $I_{SV}$ shown in FIGS. 8A and 8C.

At this time, the signal input to the I-V conversion circuit 14 ends up missing the portion below the frequency $f_{co}$ in the RF signal component $I_{RF}$ shown in FIGS. 8B and 8C, but in the present embodiment, the addition circuit 16 is used to add the servo signal input from the I-V conversion circuit 14 to the signal component $I_{RF}$ converted from current to voltage at the I-V conversion circuit 12 so as to produce the RF signal.

The addition of the two signals at the addition circuit 16 enables the dropout information which had been included below the frequency $f_{co}$ to be supplemented. Accordingly, like with the optical reproduction signal processing circuit 1, the optical reproduction signal processing circuit 5 can be used even in the case where the frequency distribution of the RF signal component $I_{Rf}$ and the frequency distribution of the servo signal component $I_{RF}$ of the optical reproduction signal $I_{pd}$ overlap.

Next, an explanation will be made of the operation of the optical reproduction signal processing circuit 5 of this embodiment.

Figure 13A:
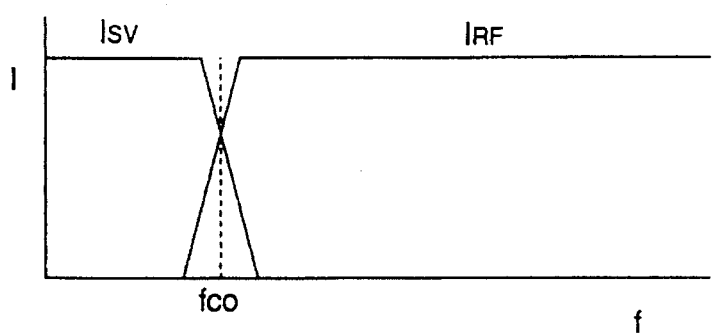
Figure 13B:
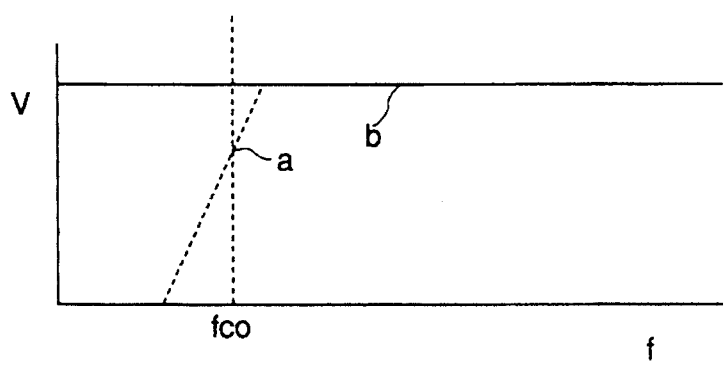
Figure 13C:
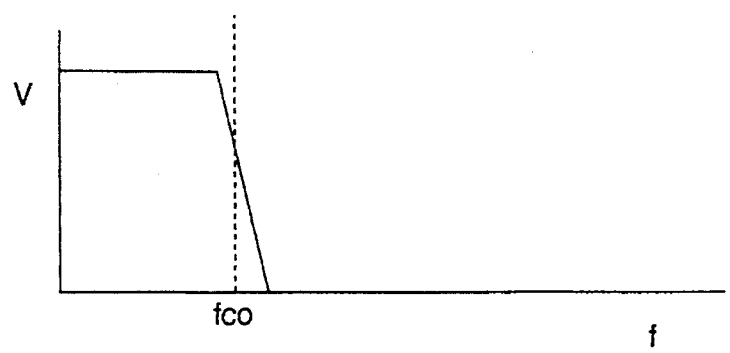

FIGS. 13A to 13C are views for explaining the operation of the optical reproduction signal processing circuit 5 shown in FIG. 12.

FIG. 13A shows the divided frequency characteristics of the current $I_{RF}$ input to the RF signal generating circuit 17 and the current $I_{SV}$ input to the servo signal generating circuit 18 obtained by division of the optical reproduction signal $I_{pd}$, FIG. 13B shows the frequency distribution of the RF signal (RF) output by the addition circuit 16, and FIG. 13C shows the frequency distribution of the servo signal (SERVO) output by an I-V conversion circuit 14.

The optical reproduction signal processing circuit 5 performs an operation similar to the optical reproduction signal processing circuit I shown in the first embodiment.

That is, the optical reproduction signal $I_{pd}$, as shown in FIG. 13A, is divided into frequency regions above the frequency $f_{co}$ and below the frequency $f_{co}$. The frequency region below the frequency $f_{co}$ is input to the servo signal generating circuit 18 as the current $I_{SV}$, while the frequency region above the frequency $f_{co}$ is input to the RF signal generating circuit 17 as the current $I_{RF}$.

In the RF signal generating circuit 17 and the servo signal generating circuit 18, as shown in the first embodiment, the current $I_{RF}$ and the current $I_{SV}$ are converted to voltages.

Note that the value of the frequency $f_{co}$ is determined so as to match with the upper limit of the frequency distribution of the servo signal component of the optical reproduction signal shown in FIGS. 8A and 8B, that is, so that all of the servo signal component of the optical reproduction signal is input to the I-V conversion circuit 14.

The frequency distribution of the servo signal is shown in FIG. 13C.

In this way, according to this embodiment, the frequency $f_{co}$ matches with the upper limit of the frequency distribution of the servo signal component of the optical reproduction signal, so all of the servo signal component of the optical reproduction signal is converted to a servo signal. Accordingly, in the rest of the circuit after the servo signal generating circuit 18, the signal output from the servo signal generating circuit 18 can be used for the focus servo and tracking servo control as it is.

On the other hand, the RF signal component of the optical reproduction signal is converted from a current to voltage by the I-V conversion circuit 14 and becomes a voltage signal.

The result of conversion by the I-V conversion circuit 14 becomes the frequency distribution corresponding to the current $I_{RF}$ as shown by the dotted line a of FIG. 13B. Accordingly, part of the RF signal component of the optical reproduction signal distributed at the frequency below the frequency $f_{co}$ in the RF signal component shown in FIG. 8B and 8D is not input to the I-V conversion circuit 14. If nothing is done in this case, some of the information required for the processing for reproduction of information at the optical disc apparatus to which the optical reproduction signal processing circuit 5 is applied would drop out and problems might occur.

Therefore, in this embodiment, the addition circuit 16 adds the servo signal output from the I-V conversion circuit 14 to the I-V converted output from the I-V conversion circuit 12 to make a correction.

As a result of the above correction processing, the RF signal output from the addition circuit 16 includes all of the information required for reproduction of information.

The addition circuit 16 further adds the servo signal input from the I-V conversion circuit 14 to the results of conversion of the I-V conversion circuit 12 for correction purposes and outputs the result as the RF signal with a flat frequency characteristic as shown by the solid line b in FIG. 13B.

The ratio of addition of the servo signal and the signal output from the I-V conversion circuit 12 is set so that the frequency characteristic after addition becomes flat.

Note that when necessary, a further addition circuit may be provided for correction of the servo signal as well.

Example of application to optical disc apparatus

Referring to FIG. 9, an explanation will now be given of the case of application of the optical reproduction signal processing circuit of the second embodiment to an optical disc apparatus using a four division photo detector.

Figure 14:
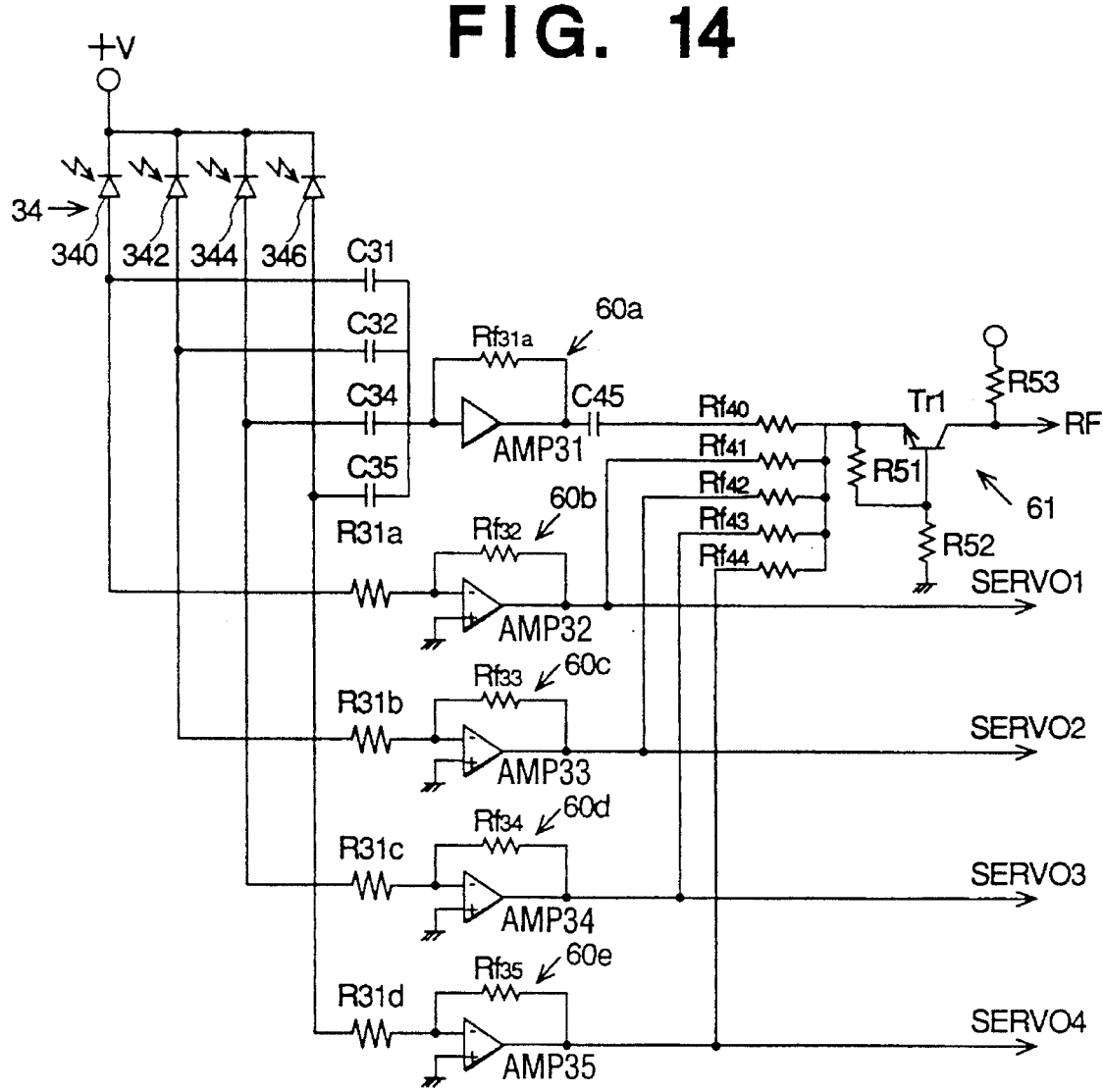
FIG. 14 is a view of the optical reproduction signal processing circuit according to a second embodiment of the present invention used in an optical disc apparatus using the photo detector shown in FIG. 7.

FIG. 14 is a view of the optical reproduction signal processing circuit 6 in the second embodiment as used for an optical disc apparatus using the photo detector 3 shown in FIG. 7. Note that components the same or similar to the optical reproduction signal processing circuit 1, 4, and 5 shown in FIGS. 9, 11, and 12 are indicated by the same or similar references.

The optical reproduction signal processing circuit 6, like the above optical reproduction signal processing circuit 5, divides the optical reproduction signals $I_{pd1}$ to $I_{pd4}$ obtained from the photo detectors 340 to 346 into the servo signal components $I_{SV1}$ to $I_{SV4}$ and the RS signal components $I_{RF1}$ to $I_{RF4}$ for processing. The optical reproduction signal processing circuit 6 is comprised of the photo detector 34, the I-V conversion circuits 60a to 60e, and the addition circuit 61.

The I-V conversion circuit 60a is comprised of the capacitors C31 to C35 and C45, the operational amplifier AMP31 and the resistor Rf31. It adds the currents $I_{RF1}$ to $I_{RF4}$, converts the result to voltage, and inputs the result to the addition circuit 61.

The I-V conversion circuits 60b to 60e are respectively comprised of the resistors R31a to R31d and Rf32 to Rf35 and the operational amplifiers AMP32 to AMP35 and convert the currents $I_{SV1}$ to $I_{SV4}$ to voltages to output the same as the servo signals SERVO1 to SERVO4.

On the other hand, the addition circuit 61 is comprised of the transistor Tr1 and the resistors Rf40 to Rf44 and R51 to R53. It adds the signals input through the resistors Rf40 to Rf44 and outputs the result as the RF signal.

Here, the capacitors C31 to C34 input the signals of the frequencies over the frequency $f_{co}$ among the optical reproduction signal $I_{pd1}$ to $I_{pd4}$, that is, the RF signal components $I_{RF1}$ to $I_{Rf4}$, to the I-V conversion circuit 60a.

The resistors R31a to R31d input the signals of the frequencies under the frequency $f_{co}$ in the optical reproduction signal $I_{pd1}$ to $I_{pd4}$, that is, the servo signal components $I_{SV1}$ to $I_{SV4}$, to the I-V conversion circuits 60a to 60d.

Further, the I-V conversion circuit 60a adds the RF signal components $I_{RF1}$ to $I_{RF4}$, converts the result from current to voltage, and inputs the result to the addition circuit 61.

On the other hand, the I-V conversion circuits 60b to 60e convert the servo signal components $I_{SV1}$ to $I_{SV4}$ from current to voltage, respectively, output the results as the servo signals SERVO1 to SERVO4, and input them to the addition circuit 61.

The addition circuit 61 adds the signal input from the I-V conversion circuit 60a and the servo signals SERVO1 to SERVO4 input from the I-V conversion circuits 60b to 60e and outputs the result as the RF signal.

The thus constituted optical reproduction signal processing circuit 5 has only one I-V conversion circuit for the I-V conversion in the relatively high frequency range of the RF signal as compared with the optical reproduction signal processing circuit shown in the second example of the prior art, and so can improve the S/N ratio of the RF signal.

Further, the optical reproduction signal processing circuit 5 shown in the second embodiment may be constructed like the optical reproduction signal processing circuit 1 shown in the first embodiment so as to add two signals and output the same as the servo signal.

As explained above, according to the optical reproduction signal processing circuit of the present invention, it is possible to faithfully reproduce both the servo signal used for focus servo and tracking servo control in an optical disc apparatus and the RF signal used for reproduction of information in the case where the frequency distributions of the servo signal and RF signal overlap.

Accordingly, it is possible to reduce the wave distortion of the signals and to reduce the error rate of the optical disc.

Further, since there is only one I-V conversion circuit for the reproduction of the RF signal even in the case of application for an optical disc apparatus using a four division photo detector, the S/N ratio of the RF signal is improved and, also, the recording density of the optical disc is improved.

Still further, there is a cost advantage since the optical components are not increased compared with the method using a half mirror.

While the invention has been described by reference to specific embodiments chosen for purposes of illustration, it should be apparent that numerous modifications could be made thereto by those skilled in the art without departing from the basic concept and scope of the invention.

What is claimed is:

1. A processing circuit for an optical reproduction signal comprising:
    a signal generating means for dividing an optical reproduction signal output from a photo detector, and including a plurality of signal components, into a plurality of signals having frequency regions corresponding to the respective plurality of signal components and performing current to voltage conversion on the divided optical reproduction signals, wherein the signal generating means, when dividing the optical reproduction signal in accordance with signal components partially overlapping each other in the frequency regions in which they are located, divides the optical reproduction signal into a frequency region in which one of the overlapping signal components is located and another frequency region; and
    a correcting means for adding the results of the current to voltage conversion of the signal components to correct the results of the current to voltage conversion, wherein the correcting means adds the results of the current to voltage conversion corresponding to the frequency region in which one of overlapping signal components is located to the results of current to voltage conversion corresponding to the other frequency region to correct dropout of information of the results of current to voltage conversion corresponding to the other frequency region.

2. A processing circuit for an optical reproduction signal as set forth in claim 1, wherein the plurality of signal components include the RF signal component used for reproduction of information in an optical disc apparatus and the servo signal used for focus servo and tracking servo control and the frequency regions in which these signal components are located partially overlap.

3. A processing circuit for an optical reproduction signal as set forth in claim 2, wherein the one of the overlapping signal components includes the RF signal component.

4. A processing circuit for an optical reproduction signal as set forth in claim 2, wherein the one of the overlapping signal components includes the servo signal component.

5. A processing circuit for an optical reproduction signal comprising:
    a signal generating means for dividing an optical reproduction signal output from a photo detector, and including a plurality of signal components partially overlapping each other in frequency regions in which they are located, into a plurality of divided signals having frequency regions corresponding to the respective plurality of signal components and performing current to voltage conversion on the plurality of divided signals, wherein the signal generating means, when dividing the optical reproduction signal in accordance with the signal components, divides the optical reproduction signal into a frequency region in which one of the overlapping signal components is located and another frequency region; and
    a correcting means for adding the results of the current to voltage conversion of the plurality of divided signals to correct the results of the current to voltage conversion, wherein the correcting means adds the results of the current to voltage conversion corresponding to the frequency region in which one of the overlapping signal components is located to the results of the current to voltage conversion corresponding to the other frequency region to correct dropout of information of the results of the current to voltage conversion corresponding to the other frequency region.

6. A processing circuit for an optical reproduction signal as set forth in claim 5, wherein the plurality of signal components include the RF signal component used for reproduction of information in an optical disc apparatus and the servo signal used for focus servo and tracking servo control and the frequency regions in which these signal components are located partially overlap.

7. A processing circuit for an optical reproduction signal as set forth in claim 6, wherein the one of the overlapping signal components includes the RF signal component.

8. A processing circuit for an optical reproduction signal as set forth in claim 6, wherein the one of the overlapping signal components includes the servo signal component.

* * * * *